Patented Sept. 29, 1925.

1,555,438

UNITED STATES PATENT OFFICE.

JUNJIRO SATO, OF HIGHLAND PARK, MICHIGAN.

BATTERY ELEMENT.

No Drawing.   Application filed May 10, 1923.   Serial No. 638,101.

*To all whom it may concern:*

Be it known that I, JUNJIRO SATO, a subject of Japan, resident of Highland Park, in the county of Wayne and State of Michigan, have invented certain new and useful Improvements in Battery Elements, of which the following is a specification.

This invention relates to a storage battery and has for its object to provide compositions for the positive and negative plates which will adhere firmly to the supporting grids at a higher degree of acidity than is feasible with compositions at present in use, whereby the strength of the electrolyte used while charging may be less than that now customarily used. By the use of the compositions herein described, the acidity may be more uniformly distributed throughout the cell and the damage caused by the strong acid of the electrolyte now required will be obviated, thus giving the plates greater endurance under ordinary conditions of use.

The ordinary storage battery consists of two sets of electrodes, positive and negative, immersed in an electrolyte. The electrodes as ordinarily made comprise supporting grids of thin lead, the spaces being filled with pastes of various compositions which are treated with an electric current in what is known as the forming charge to produce positive and negative plates. The negative electrodes are of sponge lead, and the positive electrodes consist mainly of peroxide of lead ($PbO_2$). The electrolyte is dilute sulfuric acid. The positive and negative electrodes are arranged alternately within a cell, the plates usually being set vertically, the adjacent plates being of oppositely polarity and separated from each other by insulating means commonly consisting of thin grooved wooden or hard rubber separators. In preparing the negative plates, grids having their spaces filled with litharge (PbO) are connected as cathodes with lead sheets as anodes in a bath of dilute surfuric acid, and current is passed through the cell. Hydrogen set free on passage of the current reduces the litharge to spongy metallic lead which is porous and which should be firmly adherent to the supporting grid of lead.

The positive plates consist of similar grids in which the paste primarily consists of red lead ($Pb_3O_4$) with a smaller percentage of litharge. These are connected as cathodes with plates of sheet lead as anodes, and when current is passed through the group immersed in dilute surfuric acid, the red lead on the positive plates is changed to lead peroxide ($PbO_2$).

In forming the pastes it is desirable to use a substance which will cause the powdered material to harden or set and surfuric acid has this property, but if used in too great concentration, difficulty is found in causing the paste to adhere to the grid. Substances are sometimes added to increase the porosity of the active material, such a substance being pulverized pumice stone and for the purpose of increasing the conductivity of the resulting active material, pulverized carbon usually in the form of lamp black may be added to the paste used in negative plates. In addition to these materials which have hitherto been used, I have found that if asbestos fiber in suitable proportion is added to the active materials it will act as a cement to bind them together and to retard their disintegration in use. Furthermore, when asbestos forms a part of the composition the strength of the acid used to mix the paste may be increased without loss of adhesion so that the dried paste may be made of a higher acidity than has hitherto been considered feasible.

As a further means of preventing loosening of the paste from the grid, I have found that a coating formed by dipping the pasted plates in a suspension of fine asbestos in water, will act as a cementitious surface layer which will greatly prolong the durability of the plates.

The method which I consider best in the preparation of plates is as follows:—

For the positive plates, eighty parts of red lead are mixed with fourteen parts of litharge, a sufficient quantity of sulfuric acid of sp. gr. 1.224 being added to form a suitable paste which is thoroughly mixed. To this mixture is added six parts of asbestos, the asbestos being thoroughly blended with the previous mixture and the composition then being applied to the grids with rubber rolls which compress the material within the interstices. The addition of one part of lamp black will give a somewhat softer mixture and the conductivity of the resulting active material will be slightly increased.

After pasting, the plates are allowed to dry in the air for twenty-four hours. A liquid suspension of four parts of fine asbestos and six parts of water is prepared as a coating composition. The dried plates are dipped into sulfuric acid of sp. gr. 1.150 and then dipped into the asbestos suspension which will adhere to the surface of the plate in a thin layer. The plates are then air dried for twenty-four hours, then again dipped into sulfuric acid of sp. gr. 1.125 and then heated for forty-eight hours at 175° F. The plates are then ready for the forming charge, a current of about three amperes being used with the plates in an acid solution of sp. gr. 1.125.

The negative plates will be prepared by making a mixture of eighty-eight to ninety parts of litharge with seven parts of lamp black, sufficient sulfuric acid of sp. gr. 1.150 being added to form a suitable paste. After thoroughly mixing the litharge and lamp black with the acid, three to five parts of asbestos are added and blended with the previous mixture. The paste is then applied to the grids with a rubber roller as with the positive plates. After the plates are dried in the air for twenty-four hours they are dipped in sulfuric acid sp. gr. 1.150, then immersed in the asbestos coating suspension of asbestos four parts to water six parts, again dried in the air for twenty-four hours, again dipped in the sulfuric acid sp. gr. 1.150 and then heated for twenty-four hours at 175° F. The forming charge will be about three amperes in a bath of sulfuric acid sp. gr. 1.125.

The positive and negative plates so formed will be assembled in a cell with the usual separators of wood or hard rubber, and the terminals of the plates of like polarity will be connected together in groups in the usual manner.

In the charging of a battery, electrolyte is usually sulfuric acid sp. gr. 1.350 to 1.360 (corresponding to about 45% $H_2SO_4$) and when fully charged the electrolyte will be down to a sp. gr. of about 1.285 (corresponding to about 37.5% $H_2SO_4$.

With plates prepared according to the preferred composition herein set forth the electrolyte may have a sp. gr. of 1.300 and after charging it will be found that the electrolyte will remain at substantially the same sp. gr.

It is believed that the increased durability of a battery having plates prepared as set forth is due to the more even distribution of the acid through the cell than has been possible in the methods of preparation heretofore used.

Pasted plates are frequently shipped for considerable distances from the point at which they are given the forming charge to the place at which the plates are to be assembled in battery cells. A very considerable percentage of breakage occurs, because of the relative fragile character of the material formed during this primary charge. It has been found that repairs may readily be made in such plates by using pastes having the same compositions as those previously described, for either the positive or the negative plates, the mixture being made with acid of sp. gr. 1.175, to form a somewhat softer mixture than would be used with new plates. The composition will be pressed into all crevices and into any holes that may have been left by material falling out, and the surface coating will be made somewhat stiffer than with a new plate, about six parts of asbestos being used with four parts of water. The repaired plates will be dried in the air for about twenty-four hours, dipped in acid of sp. gr. 1.150 and again dried in the air for about four days in the case of positive plates, and about two days in the case of negative plates. The repaired plates will not be given an additional forming charge before assembly, but after being assembled, a preliminary charge within the cell should be given, using about three amperes current for twenty-four hours, with an electrolyte consisting of sp. gr. 1.125 acid, after which the final charge may be given, using an electrolyte of the usual strength, sp. gr. 1.300.

I claim:—

A storage battery element containing a paste having an initial composition of litharge eighty-eight to ninety parts, carbon seven parts, asbestos three to five parts, and sulfuric acid, which when given a forming charge in a sulfuric acid bath of about sp. gr. 1.125 is converted into spongy lead intermixed with asbestos, carbon, and sulfuric acid.

In testimony whereof I affix my signature.

JUNJIRO SATO.